US010055959B1

(12) United States Patent
Russell et al.

(10) Patent No.: US 10,055,959 B1
(45) Date of Patent: Aug. 21, 2018

(54) SYSTEMS AND METHODS FOR INTRUSION DETECTION USING GHZ BEAMS

(71) Applicant: National Technology & Engineering Solutions of Sandia, LLC, Albuquerque, NM (US)

(72) Inventors: John L. Russell, Albuquerque, NM (US); Dennis Prather, Newark, DE (US); Christopher Schuetz, Newark, DE (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/287,348

(22) Filed: Oct. 6, 2016

Related U.S. Application Data

(60) Provisional application No. 62/237,725, filed on Oct. 6, 2015.

(51) Int. Cl.
  *G08B 13/18* (2006.01)
  *G08B 13/24* (2006.01)
  *G08B 13/183* (2006.01)
  *G01S 13/56* (2006.01)

(52) U.S. Cl.
  CPC .......... *G08B 13/2494* (2013.01); *G01S 13/56* (2013.01); *G08B 13/183* (2013.01)

(58) Field of Classification Search
  CPC ......... G08B 5/006; G01S 7/415; G01S 13/56; G01S 13/48; G01S 13/58; F41H 13/0068
  USPC ......... 340/556, 554, 331, 552, 13.27, 13.33, 340/13.28, 13.34, 540, 555, 557, 564, 340/565; 342/28, 133, 59; 356/343, 51, 356/451, 301
  See application file for complete search history.

(56) References Cited

U.S. PATENT DOCUMENTS

| | | | | |
|---|---|---|---|---|
| 4,602,357 A * | 7/1986 | Yang | ..... | G08B 25/016 340/13.28 |
| 5,552,767 A * | 9/1996 | Toman | ..... | G08B 5/006 340/331 |
| 5,760,687 A * | 6/1998 | Cousy | ..... | G01S 7/415 340/554 |
| 7,751,716 B2 * | 7/2010 | Killinger | ..... | H04B 10/506 398/118 |
| 8,115,919 B2 * | 2/2012 | Yun | ..... | G01J 3/4412 356/301 |
| 9,377,900 B1 * | 6/2016 | Baldwin | ..... | G06F 21/83 |
| 2004/0189510 A1 * | 9/2004 | Negro | ..... | G01S 13/56 342/28 |
| 2008/0240716 A1 * | 10/2008 | Davis | ..... | G02B 6/29361 398/50 |
| 2009/0256706 A1 * | 10/2009 | Brown | ..... | F41H 13/0068 340/552 |
| 2010/0245831 A1 * | 9/2010 | Okamoto | ..... | G01J 3/4531 356/451 |
| 2012/0194800 A1 * | 8/2012 | Debreczeny | ..... | G01N 15/06 356/51 |

(Continued)

*Primary Examiner* — Hoi Lau
(74) *Attorney, Agent, or Firm* — Daniel J. Jenkins

(57) ABSTRACT

The present disclosure is directed to systems and methods that use 1 GHz to 1000 GHz sources and sensors to create an intrusion detection array that does not have the physical limitations of an Active IR sensor. The array is created by a plurality of wave sources and sensor pairs that form a plane of wave break beams. The plane detects an intruder as he/she passes through the beams.

14 Claims, 2 Drawing Sheets

(56) References Cited

U.S. PATENT DOCUMENTS

| | | | | |
|---|---|---|---|---|
| 2014/0333471 | A1* | 11/2014 | Nagy | G01S 7/41 |
| | | | | 342/133 |
| 2014/0333472 | A1* | 11/2014 | Nagy | G01S 13/48 |
| | | | | 342/133 |
| 2015/0234042 | A1* | 8/2015 | Nagy | G01S 13/58 |
| | | | | 342/59 |
| 2015/0300938 | A1* | 10/2015 | Debreczeny | G01N 21/51 |
| | | | | 356/343 |
| 2016/0299170 | A1* | 10/2016 | Ito | G02B 26/10 |

* cited by examiner

SYSTEMS AND METHODS FOR INTRUSION DETECTION USING GHZ BEAMS

CROSS-REFERENCE TO RELATED APPLICATIONS

This application claims priority to provisional patent application U.S. Ser. No. 62/237,725, entitled "Systems and Methods for Intrusion Detection Using an Active Terahertz Beam," by Russell et al., filed Oct. 5, 2015, the disclosure of which is incorporated herein by reference in its entirety.

STATEMENT CONCERNING FEDERALLY-SPONSORED RESEARCH

This invention was developed under Contract DE-AC04-94AL85000 between Sandia Corporation and the United States Department of Energy. The U.S. Government has certain rights in this invention.

FIELD OF THE INVENTION

The present invention is directed towards physical intrusion detection, and more particularly to intrusion detection systems and methods that use millimeter (mm) wave sensors and sources to create an intrusion detection sensor array that does not have the physical limitations of an active infrared (IR) sensor or other optical systems.

BACKGROUND OF THE INVENTION

Physical security continues to become increasing important in today's world. The ability of a sensor to detect an intruder passing through that sensor's detection envelope with high probability of detection (POD) and minimum nuisance alarm rate (NAR) is of the utmost importance. Up to now, active infrared (AIR) sensors have been used to create active beams that when broken, indicate an intrusion. AIR sensors have inherent physical limitations such as generation of high nuisance alarms when subjected to low sun angles, rain, snow, fog, high ground temperatures, and dust. For example, at low sun angles, AIR sensors may be in constant alarm or result in spurious behavior because sunlight contains sufficient intensity and IR content that interferes with the AIR sensor. The security industry has not invested much effort to modify the fundamental AIR designs to reduce NAR and improve low performance from low sun angles.

What is needed are intrusion detection systems and methods that are less prone to NAR sources, such as rain, snow, fog, high temperatures, and dust, and will function reliably when the sensor is subjected to low sun angles.

BRIEF DESCRIPTION OF THE DRAWINGS

Wherever possible, the same reference numbers will be used throughout the drawings to represent the same parts.

SUMMARY

According to the present disclosure, systems and methods are disclosed that provide improved intrusion detection. The disclosed systems and methods use gigahertz (GHz) wave transmitter sand receivers to create an intrusion detection system that does not have the limitations of an active IR sensor system. A transmitter and associated receiver may be referred to as transmitter/receiver (Tx/Rx) pair. In this disclosure, Tx/Rx pairs operate between a frequency of 1 GHz and 1000 GHz. Rain, snow, fog and dust attenuate GHz wave energy much less than IR energy. Thus, the GHz wave sensor system of the present disclosure is significantly less prone to weather caused nuisance alarms compared to the Active IR (AIR) sensor systems. In addition, The GHz wave sensors not as sensitive to sunlight as AIR sensors.

The intrusion detection systems include two or more Tx/Rx pairs to create a grid or plane of beams capable of detecting an object, such as an intruder, passing through the beams.

According to an embodiment of the disclosure, an intruder detection system is disclosed that includes a plurality of transmitter/receiver modules that create a beam grid formed of a plurality of beams having a frequency between 1 GHz and 1000 GHz. The plurality of beams have a beam divergence between 0.01 and 5 degrees.

According to another embodiment of the disclosure, an intruder detection method is disclosed that includes forming a beam grid comprising a plurality of beams having a frequency between 1 GHz and 1000 GHz, and monitoring the plurality of beams for a break in one or more beams.

DETAILED DESCRIPTION

The disclosed systems and methods use a collection of high frequency, 1-1000 GHz (THz), electromagnetic beams to create a physical intrusion detection sensor with superior performance over Active Infrared (IR) Sensors. In an embodiment, the beams may be between 50 GHz and 500 GHz. The sensored area is created by a series of transmitter/receiver (Tx/Rx) pairs for the selected beam frequency within the beam frequency range. The disclosed systems and methods are superior to Active IR sensors in that THz frequencies and corresponding wavelengths are much less affected by rain, snow, hail, dust, wind, rain, fog, and low sun angles (NAR stimuli), thereby possessing a much lower NAR than Active IR system.

Figure 1:
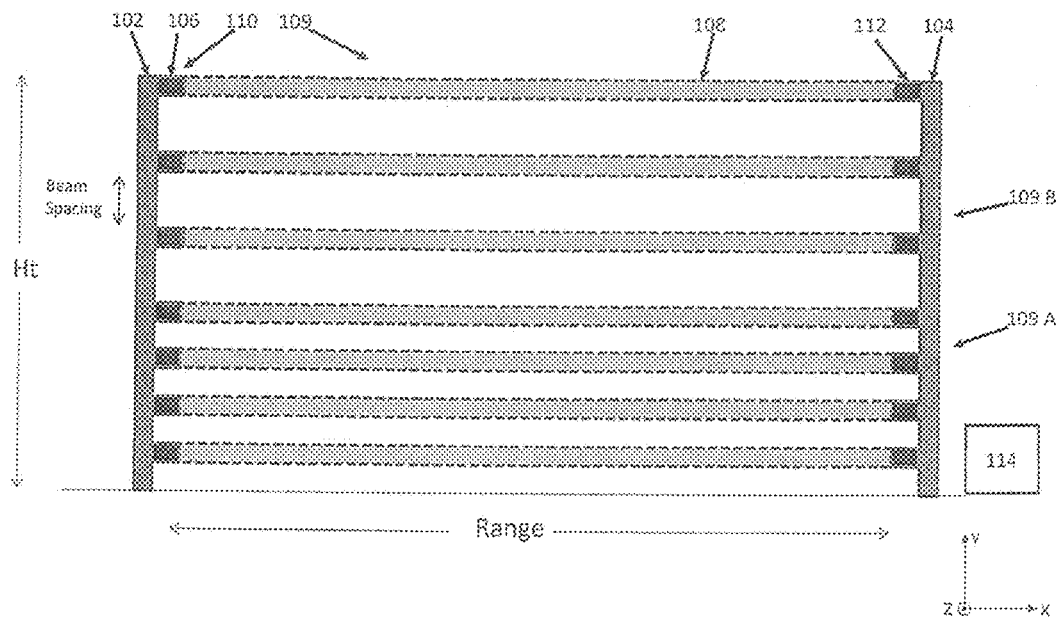
FIG. 1 illustrates an intrusion detection system according to an embodiment of the disclosure.

FIG. 1 illustrates an intrusion detection system (system) 100 according to an embodiment of the disclosure. As can be seen in FIG. 1, the system 100 includes a first tower or support 102 and a second tower or support 104 upon which a plurality of transmitter/receiver (Tx/Rx) pairs or modules 106 are arranged or disposed. The plurality of Tx/Rx modules 106 generate a plurality of corresponding electromagnetic (EM) beams (beams) 108. The plurality of beams 108 form a beam array or grid 109. Each Tx/Rx module 106 includes a transmitter module (transmitter) 110 and a receiver module (receiver) 112. The transmitter 110 generates an EM beam having a frequency of 1 GHz and 1000 GHz. In an embodiment, the frequency may be between 50 GHz and 500 GHz.

Figure 2:
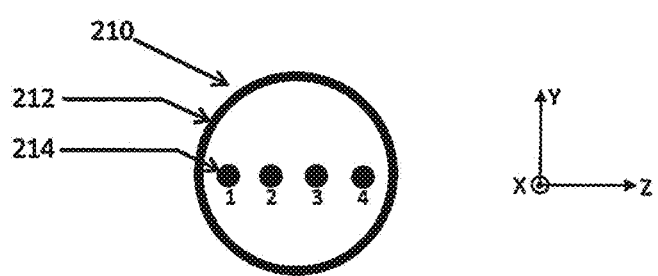
FIG. 2 illustrates an embodiment of a transmitter according to an embodiment of the disclosure.

The transmitter 110 includes a beam generator (not shown) capable of creating and projecting a beam. The beam generator includes electronics and an antenna that create a beam of a selected frequency within the range of frequency of this disclosure that has a beam divergence of between 0.01 and 5 degrees. In another embodiment, the beam divergence may be between 0.2 and 1.0 degree. In an embodiment, the transmitter 110 may include one or more beam generators capable of generating one or more corresponding beams. In an embodiment, the one or more beams may be of different frequencies. This embodiment is discussed in further detail below in regard to FIG. 2. The transmitter can include 1 or more transmitters, each possessing a different frequency and/or polarization. FIG. 2 shows a transmitter module 210 including four transmitters 214 housed in a transmitter module housing 212. The transmitter module 210 also includes a power input for receiving power from a power source (not shown).

In an embodiment, the transmitter may include a mechanical or electrical adjustment that allows vertical and horizontal beam alignment with the receiver. In an embodiment, the transmitter may include an audible alarm module that can provide a user with an audible signal indicating optimal beam alignment. Alignment of the transmitted beam can also be accomplished using a power meter that indicates a maximum power when the beam is optimally aligned. If the power meter option is used, the user has a choice to turn off the audible tone. In an embodiment, the transmitter frequency may be adjustable within 1 GHz and 1000 GHz range. For example, the transmitter frequency may be adjustable so as to generate up to 10000 different frequencies allowing the user to select a specific frequency for each Tx/Rx pair, eliminating issues of cross-talk between Tx/Rx pairs. The transmitter can be rotated about the x-axis shown in FIG. 1 to allow a vertically or horizontally polarized beam.

The receiver 112 includes electronics for receiving a beam. It also includes hardware and software for processing the received beam and sending an output signal that indicates that the beam has detected an intruder. The receiver 112 also contains a signal output module for providing the signal to an alarm system 114. In this exemplary embodiment, the signal output module includes a wireless transmitter for transmitting the output signal. In other embodiments, the signal output module may include wireless and/or wired transmission components. In another embodiment, the receiver module 112 may have some alarm functions built into the module.

In an embodiment, the receiver may include a mechanical or electrical adjustment that will allow vertical and horizontal beam alignment with the transmitter. In an embodiment, the receiver module may include an audible signal indicating optimal beam alignment with the receiver. Alignment of the receiver can also be accomplished using a power meter that indicates a maximum power when the receiver is optimally aligned with the transmitted beam. If the power meter option is used, the user has a choice to turn off the audible tone. In an embodiment, the receiver may be capable of receiving and distinguishing multiple beam frequencies in the 1 GHz to 1000 GHz range. In an embodiment, the receiver may be capable of distinguishing up to 10000 different frequencies allowing the user to select a specific frequency for each Tx/Rx pair, eliminating issues of cross-talk between Tx/Rx pairs. The receiver can be rotated about the x-axis shown in FIG. 1 to allow a reception of a vertically or horizontally polarized beam.

In an embodiment, the Tx/Rx modules may be modular such that they can be used to replace IR modules from existing Active IR modules deployed in the field that are experiencing excessive Nuisance Alarm Rates (NAR) or are being blinded by the sun at low sun angles.

The alarm system 114 includes hardware and software for processing the output signal from the receiver modules 112 and providing an alarm to a user. The alarm may be visual, audible, a message format, an XML formatted output specified in security standards, or other alarm indicator. In this exemplary embodiment, the alarm system 114 is shown as a single module. In other embodiments, the alarm system 114 may include one or more modules for receiving, transmitting and/or processing one or more output signals. For example, the alarm system 114 may include a module that receives the output signals from some or all receiver modules and only re-transmits output signals indicating an alarm to another module for display and/or user notification. In an embodiment, some or all of the alarm system functions and components may be included in one or more of the transmitters. In an embodiment, each transmitter includes the functions and components of the alarm system.

In this exemplary embodiment, the Tx/Rx modules 106 are vertically arranged horizontally paired on the first and second supports 102, 104 to form the plurality of horizontal beams 108. To form these horizontal beams 108, the transmitter modules 108 are disposed on the first support 102 so as to project a horizontal beam 108. In other embodiments, the Tx/Rx modules 106 may not be horizontally paired. For example, the Tx/Rx modules 106 may be diagonally paired so as to form a beam grid having diagonal beams.

In this exemplary embodiment, the beam spacing S, and corresponding Tx/Rx module 106 spacing, includes a lower grid zone 109A and an upper grid zone 109B having different beam spacing S. In other embodiments, the beam spacing S may be uniform across the beam grid 109, or may include two or more beam spacings. The beam spacing S can be selected based on the application and sensitivity of the size of the intrusion, for example, a hand, body, or vehicle. In an embodiment, the beam spacing S may be between 3 inches and 36 inches. In another embodiment, the beam spacing S may be between 3 inches and 12 inches. In this exemplary embodiment, the lower beam spacing is 3 inches and the upper beam spacing is 12 inches.

The first and second supports 102, 104 holding the Tx/Rx modules is built to allow placement of Tx/Rx modules 106 anywhere along the height Ht of the towers in the Y direction, allowing for closer spacing at the bottom of the detection envelop and larger spacing between the upper beams. In other embodiments, the first and second supports 102,104 may be built to attach Tx/Rx modules 106 in specific locations. The transmitter and receiver modules 110, 112 are mounted on the first and second supports 102, 104 in a manner that allows beam alignment, optimize signal strength at the receiver module 112. An alignment tool, like spotter scope, may be mounted in the Tx/Rx modules to align the beam.

The first and second supports 102, 104 have a height Ht selected for an application. In an embodiment, the height Ht may be from 3 to 15 feet. The first and second supports 102, 104 also have a range R at which distance the first and second supports 102, 104 are separated. The range R is determined by the application and beam strength/receive module sensitivity. In an embodiment, the range R may be between 1 meter (m) and 1 kilometer (km). In another embodiment, the range R may be between 30 m and 300 m. In yet another embodiment, the range R may be 100 m.

In this exemplary embodiment, the intrusion detection system includes two supports having a single beam grid disposed therebetween. In other embodiments, an intrusion detection system may include two or more systems arranged in series to create a fence, enclosure, or other arrangement to detect intrusion into a space. The systems may share one or both common supports.

In other embodiments, the intrusion detection system may be configured with two or more systems parallel to one another to form two or more parallel beam grids. For example, referring to FIG. 1, two or more systems with beam grids in the in the Z direction, or in other words, a system and beam grid behind the shown beam grid. This can be accomplished by using different support structure behind the first support structure, or by using Tx/Rx modules mounted in the Z direction behind a first XY plane of Tx/Rx modules. In such a manner, the alarm system can determine the order of detections so as to determine intrusion direction and velocity, enabling the user to implement both direction and rate of blockage as elements of the alarm criteria.

The alarm threshold can be established at least two different ways. In an embodiment, steady state signals may be monitored at the receiver and when the beam is blocked by a specified percentage, the sensor will alarm. The percent of beam blockage (% Beam) is specified in a graphical user interface (GUI) when the sensor is initially configured and installed. The alarm criteria can be modified to ignore beam blockages that occur in very short periods (T*). This will allow the sensor to ignore beam blockages caused by birds that fly through a beam and cause blockages for a few milliseconds. The T* values can be set using the configuration GUI software.

In another embodiment, alarm criterion may be accomplished by using a passive wave imager in the receiver and a linear or nonlinear arrangement of wave sources. In an embodiment, the wave sources may be millimeter wave sources. In an embodiment, a Passive Millimeter Wave (PMMW) imager may be used that corresponds to millimeter frequencies. The linear or nonlinear arrangement may be in the Y and/or Z directions. In this exemplary embodiment, the receiver includes a passive wave imager that can image a number of wave sources mounted in the transmitter.

FIG. 2 illustrates an embodiment of a transmitter module 210 that includes a housing 212 containing four wave sources that generate four beams. The sources may generate beams of the same or different frequencies that are received by a passive wave imager in the receiver. The use of different frequency bands or codes (this is the first time this word was used, should it be discussed above in the discussion of beam and transmitter characteristics, if yes, please add) can be used prevent interference of adjacent sensors. This arrangement allows the system and sensor to detect direction and velocity of an intruder, enabling the user to implement both direction and rate of blockage as elements of the alarm criteria, similar to the parallel systems embodiment discussed above. In an embodiment, this multi-source transmitter arrangement can use the simple percent blockage as alarm criteria, if direction and velocity is not desired. The multi-source transmitter concept, allowing people to pass in one direction without alarming but not the other, can be thought of as a people sensor diode. For example, this can be useful at shift breaks, when a large out flux of workers is anticipated in one direction but not in the other.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A intruder detection system, comprising
a plurality of transmitter/receiver modules that create a beam grid formed of a plurality of beams having a frequency between 1 GHz and 1000 GHz;
wherein the plurality of beams have a beam divergence between 0.01 and 5 degrees;
wherein the transmitter/receiver modules comprises a transmitter and a receiver placed at a distance from the transmitter; and
wherein the transmitter comprises two or more beam generators that generate beams of different frequencies.

2. The intruder detection system of claim 1, wherein the beam divergence is between 0.2 and 1.0 degrees.

3. The intruder detection system of claim 1, wherein the plurality of transmitter/receiver modules are modular.

4. The intruder detection system of claim 1, further comprising:
an alarm system connected to the plurality of transmitter/receiver modules.

5. The intruder detection system of claim 1, wherein the receiver includes electronics that distinguish two or more simultaneously received beams of different frequencies.

6. The intruder detection system of claim 4, wherein the alarm system is capable of determining the direction of intrusion.

7. An intruder detection method, comprising:
forming a beam grid comprising a plurality of beams having different frequency between 1 GHz and 1000 GHz by simultaneously generating two or more beams of the plurality of beams having different frequencies; and
simultaneously receiving, distinguishing and monitoring the plurality of beams for a break in one or more beams.

8. The method of claim 7, further comprising;
initiating an alarm upon a detection of a break in one or more of the beams.

9. The method of claim 7, further comprising:
determining the direction of intrusion by comparing the sequence of break in two or more beams.

10. An intruder detection system, comprising
a plurality of transmitter/receiver modules that create a beam grid formed of a plurality of beams having a frequency between 1 GHz and 1000 GHz;
wherein the plurality of beams have a beam divergence between 0.01 and 5 degrees;
wherein the transmitter/receiver modules comprises a transmitter and a receiver placed at a distance from the transmitter; and
wherein the receiver includes electronics that distinguish two or more simultaneously received beams of different frequencies.

11. The intruder detection system of claim 10, wherein the beam divergence is between 0.2 and 1.0 degrees.

12. The intruder detection system of claim 10, wherein the plurality of transmitter/receiver modules are modular.

13. The intruder detection system of claim 10, further comprising:
an alarm system connected to the plurality of transmitter/receiver modules.

14. The intruder detection system of claim 13, wherein the alarm system is capable of determining the direction of intrusion.

* * * * *